C. G. FERRON.
Improvement in Confluent Cocks for Filling Soda-Bottles.
No. 129,016. Patented July 16, 1872.
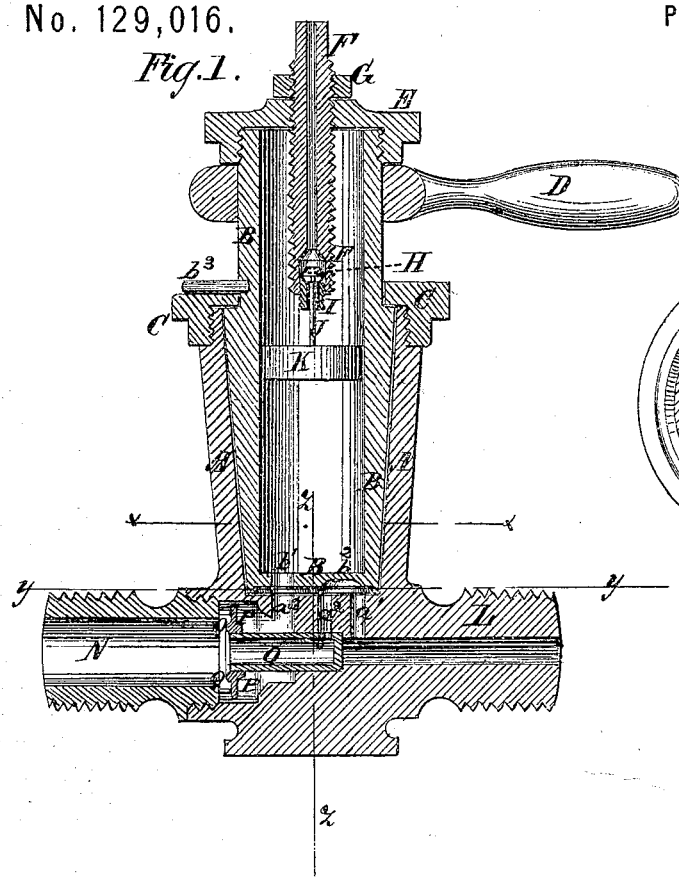
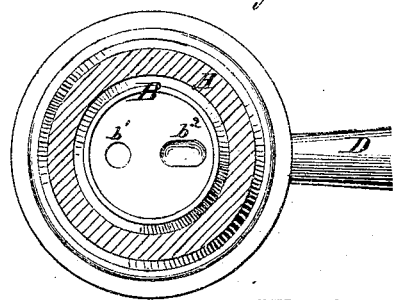
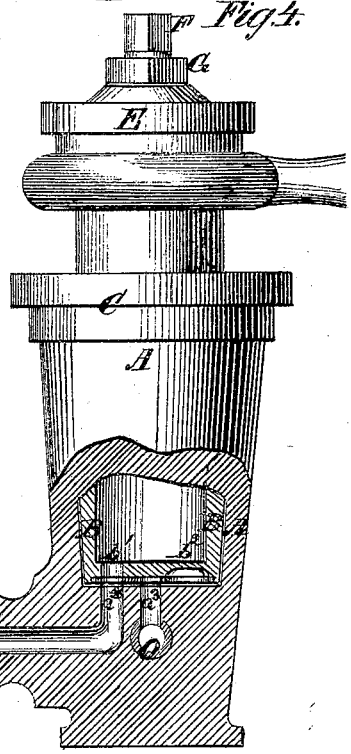
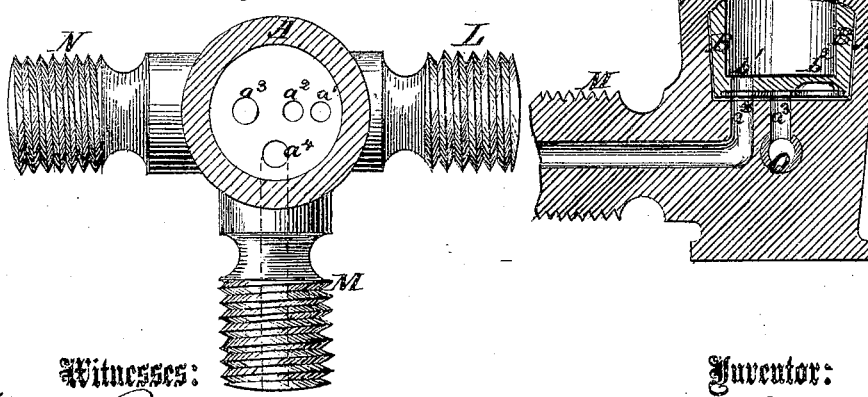
Witnesses:
John Becker
Geo. W. Mabee
Inventor:
C. G. Ferron
Per Munn & Co
Attorneys.

129,016

UNITED STATES PATENT OFFICE.

CHARLES G. FERRON, OF NEW YORK, N. Y.

IMPROVEMENT IN CONFLUENT COCKS FOR FILLING SODA-BOTTLES.

Specification forming part of Letters Patent No. 129,016, dated July 16, 1872.

Specification describing a new and Improved Sirup-Gauging Cock for Soda-Bottling Machines, invented by CHARLES G. FERRON, of the city, county, and State of New York.

Figure 1 is a detail vertical section of my improved gauging-cock, shown in position for the soda and sirup to flow into the bottle. Fig. 2 is a bottom view of the plug, the barrel being shown in section through the line $x\,x$, Fig. 1. Fig. 3 is a detail section of the same taken through the line $y\,y$, looking downward. Fig. 4 is a side view of the same, partly in section, through the line $z\,z$, Fig. 1, the parts being shown in position for receiving the sirup.

Similar letters of reference indicate corresponding parts.

My invention has for its object to furnish an improved cock for soda-bottling machines which shall be so constructed as to discharge the soda and sirup at the same time through the same pipe, and which may be adjusted to admit exactly the required amount of sirup each time; and it consists in the construction and combination of the various parts of the device, as hereinafter more fully described.

A is the barrel of the cock, the cavity of which is made tapering to receive the tapering plug B, which is secured in the barrel A by the hand-nut C, which screws upon the upper end of the barrel A and overlaps a shoulder formed upon the plug B, as shown in Fig. 1. The plug B is made hollow, and has a single hole, $b^1$, formed in its bottom, so that the sirup may be allowed to flow in or out by partially turning the said plug B. The plug B is turned or adjusted by means of a lever, D, formed upon or attached to its upper part, and its movement is limited by a stop-pin, $b^3$, attached to it, and which works in a long notch or slot formed in the screw-cap C, as shown in Fig. 1. The upper end of the hollow plug B is closed by a screw-cap, E, which has a screw-hole formed through its center to receive a screw-stem, F, which may be turned down or up, and which is secured in place, when adjusted, by a lock-nut, G, placed upon its upper part, and which is turned down against the cap E. The stem F is made hollow, and the lower part of its bore is enlarged to form a seat for a valve, H, which valve is so formed that when forced upward it may close the cavity of the stem F and entirely prevent the passage of air, and so that when forced downward it shall allow the air to pass through freely. The valve H is secured in place by a hollow screw-plug, I, and is attached to the upper end of a small rod, J, which passes through a cavity of the plug I and has a float, K, attached to its lower end. By this construction, as the inflowing sirup reaches the float K, the said float rises and forces the valve H upward into its seat, entirely preventing the escape of the air, and consequently the inflow of any more sirup. The float K is adjusted to regulate the amount of sirup admitted by turning the hollow stem F up or down. The base of the barrel A is provided with three passages or pipes, L M N. The pipe L leads to the soda-water reservoir, the pipe M to the sirup-reservoir, and the pipe N leads to the bottle to be filled. The passage from the pipe L leads directly through the base of the barrel A and is closed by the closed end of the pipe O. The part of said passage in which the pipe O is placed is enlarged, so that the capacity of the said pipe O may be the same as the capacity of the passage leading to the pipe L. The pipe O opens into the pipe N. The soda-water passes from the passage L into the pipe O through the holes $a^1\,a^2$ formed in the bottom of the barrel A and the hole $o'$ formed in the side of the pipe O and corresponding in position with the hole $a^2$. In the bottom of the hollow plug B is formed a cavity, $b^2$, of such a size as to inclose and thus connect the upper ends of the holes $a^1\,a^2$, and in such a position that it may be directly over the said holes when the hole $b^1$ is directly over the discharge-hole $a^3$, so that the sirup may flow out of the plug B and the soda-water may flow through the cock at the same time. When the plug B is adjusted to allow the sirup to flow from the passage M, through the hole $b^1$, into said plug, the cavity $b^2$ will be moved away from the holes $a^1\,a^2$, and said holes will be closed by being covered by the solid bottom of the plug, entirely stopping the flow of the soda-water. The passage N, to its point of intersection with the hole or passage $a^3$, is enlarged, so that the sirup may flow out around the open end of the pipe O and mingle with the soda-water as it issues from said pipe O. P is a sliding ring-valve placed upon the pipe O, and which is pushed outward by the outflowing sirup which flows around it. The valve P is kept from being pushed out too far by the outflowing sirup by stop-pins Q attached to the pipe N or base of the barrel A, as shown in Fig. 1. When the bottle is filled the back pressure of the liquid forces the valve P inward so as to close the hole $a^3$ and prevent the soda-water from flowing back into the plug B.

Having thus described my invention, I claim as new and desire to secure by Letters Patent—

1. The combination of the hollow adjustable screw-stem F, valve H, rod J, and float K with the hollow plug B of the cock, substantially as herein shown and described, and for the purpose set forth.

2. The arrangement of the passages or pipes L M N, pipe O closed at one end, holes or passages $a^1$ $a^2$ $a^3$ $a^4$ $o'$ $b^1$, recess $b^2$, and ring-valve P, with respect to each other and to the barrel A and hollow plug B, substantially as herein shown and described, and for the purposes set forth.

CHARLES G. FERRON.

Witnesses:
   JAMES T. GRAHAM,
   T. B. MOSHER.